July 8, 1930. E. G. CARROLL 1,770,064
FLUID BRAKE APPARATUS FOR AUTOMOBILES
Filed Aug. 20, 1927  2 Sheets-Sheet 1

Inventor
Eugene G. Carroll;
By Lyon & Lyon
Attorneys

July 8, 1930. E. G. CARROLL 1,770,064
FLUID BRAKE APPARATUS FOR AUTOMOBILES
Filed Aug. 20, 1927 2 Sheets-Sheet 2
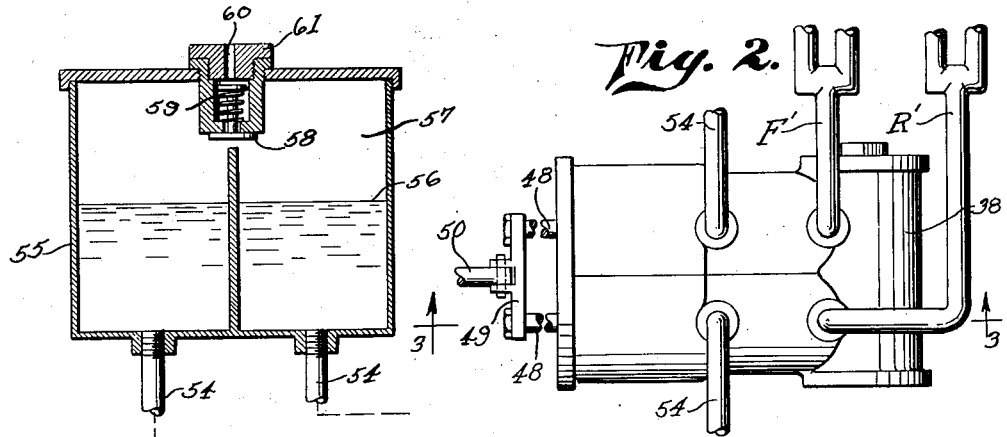
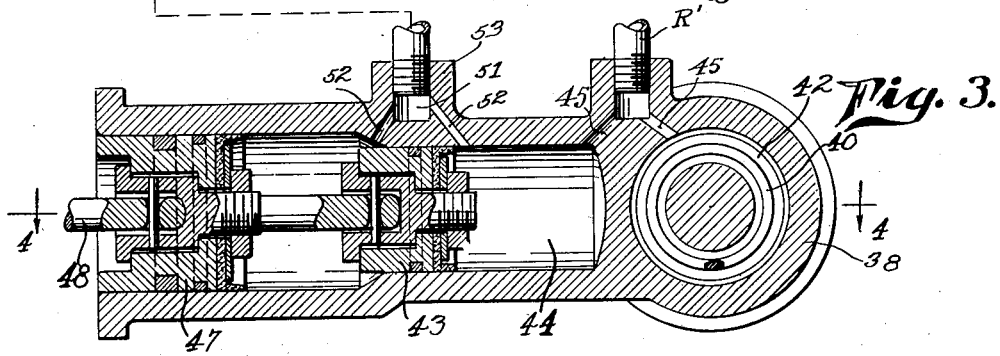
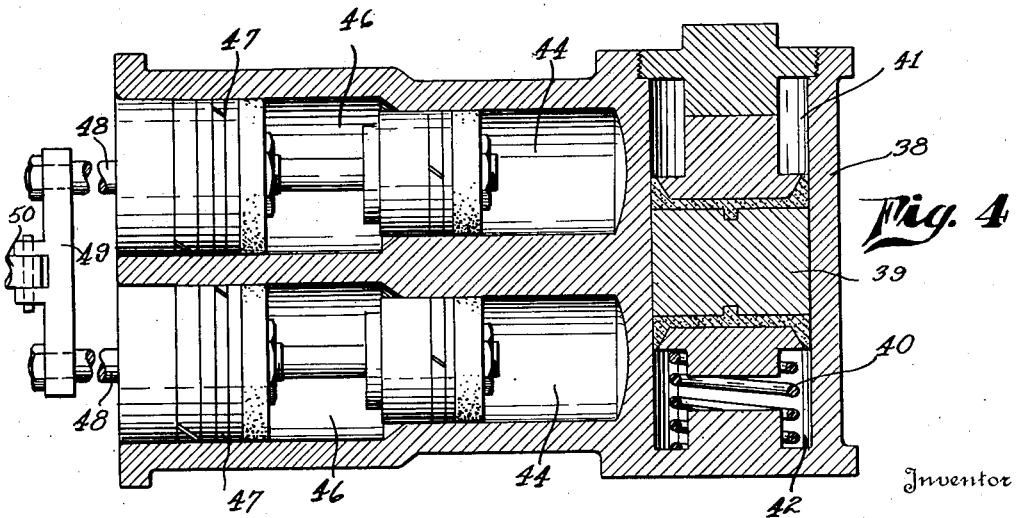
Inventor
Eugene G. Carroll;
By Lyon & Lyon
Attorneys Patented July 8, 1930

1,770,064

UNITED STATES PATENT OFFICE

EUGENE G. CARROLL, OF LOS ANGELES, CALIFORNIA, ASSIGNOR TO THE DUAL-BRAKE CORPORATION, OF NEW YORK, N. Y., A CORPORATION OF DELAWARE

FLUID-BRAKE APPARATUS FOR AUTOMOBILES

Application filed August 20, 1927. Serial No. 214,330. REISSUED

This invention relates to a fluid actuated, or hydraulic brake apparatus and is intended especially for use on automobiles. Such an apparatus usually includes a master cylinder in which a piston moves. When this piston is operated by the brake pedal, the pressure of the fluid or liquid in front of the piston is raised and imparted to the hydraulic brake cylinders at the wheels. The operating liquid is supplied to the interior of the master cylinder through a port located just in front of the position of the piston when the brake is in its inactive position; that is to say, when the brakes are "off". In this type of apparatus the master cylinder has been provided with a head through which a stem, or piston rod, slides in order to operate the piston, and the cylinder is provided with a by-pass port which connects the chambers in front of the piston and back of the piston when the piston is in its inactive position. With that arrangement a difficulty has arisen by reason of the fact that when the piston is moved forwardly a quantity of liquid in front of the piston passes through the by-pass port around to the chamber at the rear of the piston and, therefore, there is a loss in the quantity of liquid in front of the piston. This interferes with the effective application of the brakes. This difficulty is not overcome by maintaining the liquid in the cylinder in front of the piston under pressure, because, even if this pressure does exist, the by-passing occurs just the same, and, consequently, there is the effect of lost motion in the first part of the movement of the piston. The general object of this invention is to overcome this difficulty and to provide a master cylinder in which the increase in pressure in the cylinder in front of the piston will begin immediately when the piston begins its advance in the braking movement.

In the operation of automobile brakes of the four-wheel type, it has become recognized as bad practice to have the front wheels "braked" with greater force than the rear wheels. In other words, the braking action should be greatest on the rear wheels. One of the objects of this invention is to provide an apparatus which will automatically insure that the braking effect on the front wheels will be less than that on the rear wheels; also to construct the apparatus in such a way that in case the braking apparatus for the rear wheels, or for the front wheels, should become inactive then the braking apparatus for the other wheels will continue to function effectively. In other words, according to my invention, I provide a dual system for the rear wheel brake cylinders and for the front wheel brake cylinders, connected up in such a way that there is an equalizing pressure connection between the two apparatuses preventing the application of too great power to the front wheels, but enabling the rear wheel braking apparatus to continue to function properly in case the front wheel braking apparatus gets out of order, and vice versa, and this is accomplished automatically and without any adjustment or attention being necessary from the driver of the car.

Further objects of the invention will appear hereinafter.

The invention consists in the novel parts and combination of parts to be described hereinafter, all of which contribute to produce an efficient fluid brake apparatus for automobiles.

A preferred embodiment of the invention is described in the following specification, while the broad scope of the invention is pointed out in the appended claims.

In the drawing:

Fig. 2 is a plan showing a twin cylinder construction with connections to the rear and front wheels. This view particularly illustrates the invention as applied to a twin cylinder type of braking apparatus.

Fig. 3 is a vertical section taken about on the line 3—3 of Fig. 2 upon an enlarged scale and illustrating diagrammatically the manner of connecting the twin cylinders with a reservoir for the operating liquid.

Fig. 4 is a horizontal section taken about on the line 4—4 of Fig. 3.

Figure 1:
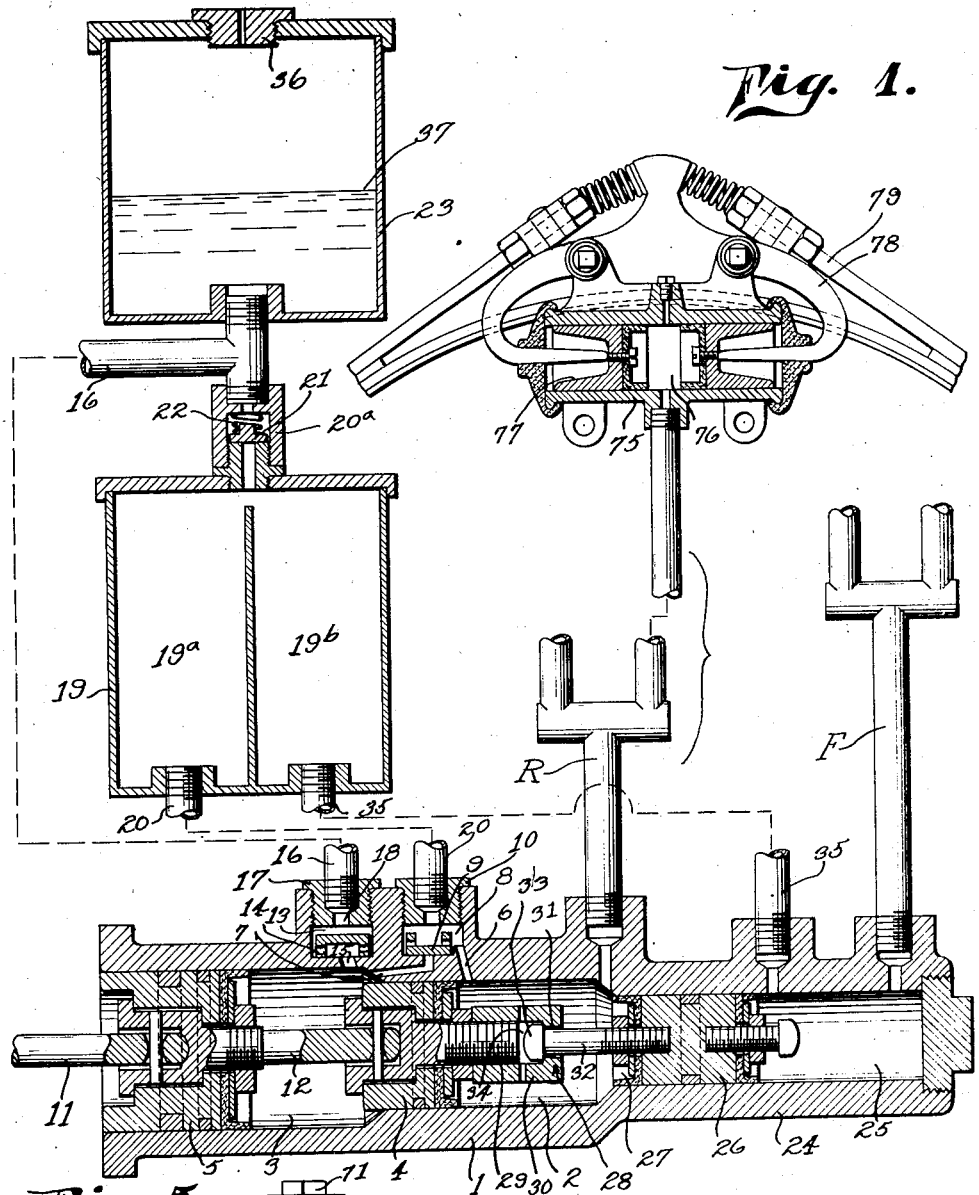
Fig. 1 is a general view diagrammatic in its nature, but showing the principal parts of the apparatus in cross section and indicating the connections to the front and rear wheels.

Referring to the parts of the apparatus, and particularly to Fig. 1, in this embodiment of the invention I provide a master cylinder 1. I shall now describe the improvements I employ in connection with this cylinder to overcome the objections referred to in the statement of my invention; namely, the loss of pressure in the master cylinder in front of the piston, due to the escape of liquid that by-passes the advancing piston. As regards this feature of my invention, it should be understood that this improvement can be applied to any brake apparatus involving the use of a master cylinder, and is not in any sense confined to a system in which equalization takes place in the braking pressures used for the front and rear wheels. In other words, this improvement could be applied in any braking apparatus having a master cylinder in which the pressure is developed in the fluid and transmitted to the brake cylinders at the wheels.

In applying this improvement to a master cylinder 1, I form this cylinder with two bores or chambers 2 and 3; the former may be considered as the forward chamber of the cylinder and the latter the rear chamber. The forward bore 2, at its forward end, is provided with a pipe connection R leading to the brake cylinders at the wheels. This connection R may lead to brake cylinders at the two rear wheels or it may lead to brake cylinders at all four wheels. I provide means for maintaining the pressure in the forward bore as its piston advances across its fluid supply port referred to hereinafter as port 6. In the bore 2 I provide a plunger having a piston 4, preferably of relatively small diameter, and in the bore 3 I provide a piston 5 preferably of relatively large diameter. I provide a by-pass port connection around the piston 4 and opening communication between chambers 2 and 3. In the present instance, this connection includes two passages 6 and 7 communicating with a small chamber 8, the port 6 passing through the wall of the cylinder into the bore 2 slightly in advance of the position of the piston 4 when the brakes are inactive; that is to say, when the brakes are "off". Associated with this port connection between the two chambers 2 and 3, I provide a check valve 9 which permits the flow from the chamber 3 through the connection but which prevents flow through the connection from the chamber 2 toward the chamber 3.

Liquid under pressure slightly above the atmosphere is supplied to the chamber 2 through the passage 6. This liquid may be admitted through a screw plug 10 into the chamber 8. The piston 5 is connected by a stem or link 11 with the brake pedal and when the brakes are applied a thrust is exerted in this part 11 and imparted to the piston 5. The piston 5 is connected with the piston 4 through a strut link 12. This is the arrangement which I prefer to employ where the two bores 2 and 3 are in tandem with each other to facilitate the use of tandem pistons, as illustrated.

Operating liquid under pressure is supplied to the bore 3 through a valve chamber 13 provided with a valve 14 mounted over a port 15 leading into the interior of the chamber from the valve chamber 13. The operating fluid is admitted through a pipe connection 16 mounted in a screw plug 17 with an admission port 18 in its lower end communicating with the valve chamber 13. With this arrangement it is evident that upon the sudden increase in pressure in the chamber 3 the valve 14 would rise and come against the lower end of the plug 17 thereby closing the outlet through the port 18.

With the apparatus already described it will be evident that when the pistons 4 and 5 advance in the braking movement, the movement of the piston 5 immediately causes a differential action of the pistons, involving an increase in pressure in the liquid in the chamber 3, causing a flow of liquid through the port 7 into the chamber 8, and this produces a sudden rise in pressure at this point which prevents an escape of liquid through the port 6 as the piston 4 advances, and in fact may cause a flow from the larger cylinder into the smaller cylinder on account of the movement of liquid from the smaller cylinder toward the brakes.

I may make the pistons 4 and 5 of the same diameter, in which case, the piston 5 will maintain pressure in the liquid in the port 6 and will prevent the by-passing flow, and consequent reduction in volume in the liquid in front of the piston 4 as it advances, but will not cause any rise in pressure in chamber 3.

The liquid under pressure is supplied through the plug 10 to a pressure reservoir 19 the bottom of which is connected by pipe connection 20 to the plug.

As additional means for preventing efflux from port 6 I prefer also to provide a check valve or its equivalent in the system, insuring immediate compression of the liquid in advance of piston 4 when it advances. This valve may be located at the reservoir 19 as will now appear.

The pressure reservoir 19 is at all times completely filled with the operating liquid. At its upper side it is preferably provided with a relief outlet 20ª including a valve 21 held on its seat by a spring 22. Any liquid that escapes through this relief valve 21 will be collected in an auxiliary or overflow reservoir 23. Liquid which passes the valve may be returned to the chamber 3 through the pipe 16 which, in the present instance, is connected to the relief valve between the pressure reservoir 19 and the overflow reservoir 23. As illustrated, the pressure reservoir 19 is shown as a dual reservoir. That is its preferred form when used with a dual system in which there is a pressure piston corresponding to the front wheels and another pressure piston corresponding to the rear wheels. I shall now proceed to describe the features of this master cylinder when it is adapted to the dual type of brake apparatus.

When the master cylinder is adapted to the dual type it is provided with an extension 24 having a bore or chamber 25 of smaller diameter than the bore 2. This bore 25 carries a piston 26, the left end 27 of which is exposed to the pressure of the liquid in the chamber 2. When the piston 4 advances in the braking movement the rise of the pressure in the chamber 2 causes a movement of the piston 26 toward the right, thereby compressing the liquid in the chamber 25 and communicating this pressure through the connection F to the hydraulic cylinders of the forward wheels. I prefer to provide a slip connection 28 between the piston 4 and the piston 26. This slip connection comprises a threaded shank 29 over which a threaded coupling 30 is screwed. This coupling 30 has an opening 31 through it to receive the shank of a pin 32, or bolt, that is threaded into the adjacent end of the piston 26. Between the head 33 of this connecting bolt and the end of the shank 29 a gap or space 34 is formed. In the normal operation of the brake apparatus this gap would not close because the development of pressure in the chamber 2 by the movement of the piston 4 would cause the piston 26 to advance before the end of the shank 29 engaged the head 33. With this organization of parts it will be evident that whatever pressure is developed in the chamber 2 by the advance of the piston 4, a corresponding pressure will be developed in the chamber 25. The area of the piston 26 should be less than half that of the piston 4 so that there will of course be a smaller piston displacement in chamber 25 for a given advance of these two pistons, and hence whenever the brakes are applied there would be a greater quantity of liquid forced into the connection R than would be forced into the connection F to the front wheels. This gives the front wheels a relatively low braking power, which is to be desired.

The liquid under pressure may be supplied to the chamber 25 through a pipe connection 35 leading to it from the pressure reservoir 19. If desired the pressure reservoir 19 can be constructed so that it has two chambers, 19$^a$ and 19$^b$, the former of which is connected to the pipe connection 20 leading to the bore 2 and the latter of which supplies the liquid to the bore 25.

The liquid for the system may be supplied by removing a plug 36 in the cover of the overflow reservoir 23. The level of the liquid in the system may be at the point indicated by the line 37. It will be understood that the overflow tank 23 need not be under pressure and is vented to the atmosphere through the plug 36.

Referring again to the chambers 2 and 25, it should be understood that in the operation of the apparatus, the piston 26 operates as a pressure equalizer between these chambers. This results by reason of the lost motion between the head 33 and the end of the shank 29. If the pressure is low in chamber 2 there will be more movement at this connection and less effective advance by the plunger 26.

I shall now describe an embodiment of an equalizer which in operation equalizes the pressure in the liquid that operates the rear brakes and the liquid that operates the front brakes. Referring particularly to Figs. 2 to 4 inclusive, in this feature of the invention I provide an equalizing cylinder 38 in which there is located a movable piston 39. This movable piston is normally at an extreme point in the cylinder 38, being held there by a coil spring 40. This spring is simply a light return spring and requires only a very light force to compress it. In this way two equalizing chambers 41 and 42 are formed, the former of which is connected by a connection F' with the forward brakes while the chamber 42 is connected by a connection R' with the rear brake cylinders.

The fluid pressure in the two chambers 41 and 42 will be developed by the advance of their pistons 43 (see Fig. 3) in the bores or chambers 44, the inner ends of which communicate respectively with the chambers 41 and 42 through the two passages, such as the branch passage 45 (see Fig. 3). Each passage 45 communicates with its corresponding pipe connection F' or R'. If desired the cylinders 44 may be cast integral with the cylinder 38 which is located on their end as a cross cylinder. The two chambers 44 are arranged in tandem with two bores 46 of slightly larger diameter and provided with their corresponding pistons 47. These pistons 47 may be advanced in unison by stems 48 attached to a cross head 49 operated by strut link 50 connecting with the brake pedal. Liquid under hydro-static pressure is supplied to the chambers 44 and 46 through a passage 51 which may have two branches 52 corresponding to each of the bores. This passage is most conveniently formed in a boss 53 connected by a pipe connection 54 with a dual reservoir 55 in which the operating liquid is carried. The liquid level in this reservoir may be at the point indicated by the line 56. The upper part of the reservoir 55 operates as an air chamber 57, air being admitted through a valve 58 which opens inwardly and is normally held on its seat by a coil spring 59. When the liquid level falls in this reservoir and a partial vacuum is developed in it, this valve will open and admit air through a port 60 in a plug 61 mounted in the upper end of the valve casing.

Figure 5:
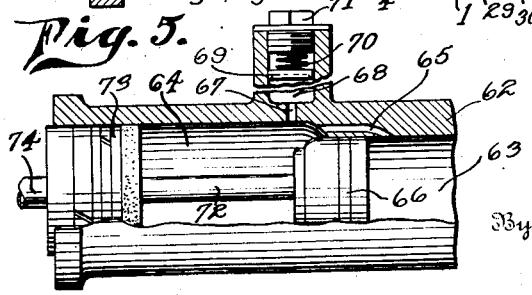
Fig. 5 is a longitudinal section through a master cylinder of the type illustrated in Fig. 1, but showing another embodiment of the invention which avoids the necessity of using a pressure reservoir and an auxiliary relief reservoir such as illustrated in Fig. 1.

Another embodiment of the invention is illustrated in Fig. 5 which avoids the necessity of employing reservoirs for the operating liquid. In this view 62 represents the master cylinder having two bores 63 and 64, the latter of which is of slightly larger diameter than the former. These bores are connected by a port 65 which by-passes the small piston 66. The chamber or bore 64 is connected through a bore 67 with a small overflow chamber 68 which is in the form of a small cylinder or boss cast into the wall of the cylinder 62 and provided with a piston 69 pressed down by a spring 70 which thrusts at its upper end against a removable screw plug 71. The piston 66 is connected by a rod 72 with a piston 73 of large diameter working in the bore 64. With this organization of parts when the pistons 73 and 66 are advanced in unison by a force imparted from the brake pedal through the part 74, the rise in pressure in the chamber 64 merely causes a flow through the port 65 into the chamber 63 thereby preventing a loss of pressure as might occur by an outward flow of liquid in this port from the chamber 63 as the piston 66 advances. Therefore, the advance of the piston 66 merely causes a rise in pressure in the chamber 63 which is communicated to the brake cylinders connected to this cylinder through a connection similar to the connection R.

Any suitable brake cylinders may be employed with the brake apparatus described above. In Fig. 1 I illustrate a common type of brake cylinder including a cylindrical casing 75 with a middle chamber 76 to which the liquid under pressure is admitted. The pressure in this liquid presses out the pistons 77 whose movement is communicated through rockers 78 to the ends of brake band 79. The chamber 3 operates of course to catch any leakage from the chamber 2 past the piston 4.

In the operation of the apparatus shown in Figs. 2 to 4, if the pressure in the chamber 42 should fail or drop, the piston 39 will be moved over, which will be permitted by the spring, automatically enlarging the chamber 41 and in this way automatically reducing the pressure in the chamber 41. This automatically reduces the braking power of the forward brakes. In this way the pressure for applying their braking power will always be kept as low as that of the rear brakes. But if either side of the system should break down the other side will continue to function properly.

It is understood that the embodiments of the invention described herein are not the only embodiments this invention may take, and I do not wish to be limited in the practice of the invention, nor in the claims, to the particular embodiments set forth.

What I claim is:

1. In a hydraulic brake apparatus for an automobile, the combination of cylinder means having a bore with a piston working therein, there being a port leading into said bore immediately in advance of the piston when in its inactive position, for supplying operating liquid to the bore, connections from the bore to the brake cylinders at the wheels and means for maintaining a predetermined pressure in said port brought into action while the piston is advancing, operating to prevent efflux of liquid from the bore through the port and thereby preventing loss in the volume of liquid in front of the piston as it advances.

2. In a hydraulic brake apparatus for an automobile, the combination of cylinder means having two bores, pistons working in said bores in unison with each other, one of said bores being of relatively small diameter and connected with the wheel brake cylinders, and the other bore being unconnected with the brake cylinders, and of relatively large diameter, said bores having a port connecting the same, the large piston operating in its forward movement to prevent loss in the volume of liquid in front of the piston of smaller diameter as it advances.

3. In a hydraulic brake apparatus, the combination of a master cylinder having two bores with pistons working in said bores in unison with each other, one of said bores being of relatively small diameter and connected with the wheel brake cylinders, and the other of said bores being unconnected with the brake cylinders and of relatively large diameter, said small bore having a port for supplying the operating liquid to the same, located in the wall of the cylinder in front of the small piston when in its inactive position, said port being in communication with the large bore and operating to maintain the pressure of the operating liquid at said port and prevent escape of the operating liquid from the small bore on the forward stroke of the pistons when the brakes are being applied.

4. In a hydraulic brake apparatus, the combination of a master cylinder having two bores with pistons working in said bores in unison with each other, one of said bores being of relatively small diameter and connected with the wheel brake cylinders, and the other of said bores being of relatively large diameter, said small bore having a port for supplying the operating liquid to the same, located in the wall of the cylinder in front of the small piston when in its inactive position, said port being in communication with the large bore, means for maintaining a supply of liquid under pressure in communication with the said port, said pistons co-operating in their forward movement in applying the brakes, to develop a movement of liquid from the large bore toward the said port and thereby prevent escape of liquid through the said port from the small bore as its piston advances.

5. In a hydraulic brake apparatus, the combination of a master cylinder having two bores with pistons working in said bores in unison with each other, one of said bores being of relatively small diameter and connected with the wheel brake cylinders, and the other of said bores being of relatively large diameter, said small bore having a port for supplying the operating liquid to the same, located in the wall of the cylinder in front of the small piston when in its inactive position, a pressure chamber for maintaining a quantity of operating liquid under pressure, a valve-chamber communicating with the same, and with said port, and having a port leading from the large bore with a check-valve to permit flow from the large bore into the valve-chamber, the said pistons operating in their forward movement in applying the brakes, to develop a movement of liquid from the large bore into the said valve-chamber and thereby supply liquil under pressure to the said first-named port and prevent escape of liquid through the said first named port from the small bore as its piston advances.

6. In a hydraulic brake apparatus, the combination of a master cylinder having two bores with pistons working in said bores in unison with each other, one of said bores being of relatively small diameter and connected with the wheel brake cylinders, and the other of said bores being of relatively large diameter, said small bore having a port for supplying the operating liquid to the same, located in the wall of the cylinder in front of the small piston when in its inactive position, a chamber communicating with the port, a reservoir for the liquid in communication with the chamber and having means connecting the reservoir with the large cylinder for maintaining the liquid under pressure.

7. In a hydraulic brake apparatus, the combination of a master cylinder having two bores with pistons working in said bores in unison with each other, one of said bores being of relatively small diameter and connected with the wheel brake cylinders, and the other of said bores being of relatively large diameter, said small bore having a port communicating with the large bore for supplying the operating liquid to the small bore, located in the wall of the cylinder in front of the small piston when in its inactive position, and a valve associated with the port for permitting flow of liquid from the large bore toward the small bore but operating to check the flow of liquid from the small bore toward the large bore.

8. In a hydraulic brake apparatus, the combination of a master cylinder having two bores with pistons working in said bores in unison with each other, one of said bores being of relatively small diameter and connected with the wheel brake cylinders, and the other of said bores being of relatively large diameter, said small bore having a port communicating with the large bore for supplying the operating liquid to the small bore, located in the wall of the cylinder in front of the small piston when in its inactive position, a valve-chamber in the wall of the cylinder communicating with the said port, a valve therein operating to permit flow of liquid through the port from the large bore toward the small bore and to check the flow from the small bore toward the large bore, and a pressure reservoir communicating with the valve chamber for supplying the same with liquid under pressure.

9. In a hydraulic brake apparatus, the combination of a master cylinder having two bores with pistons working in said bores in unison with each other, one of said bores being of relatively small diameter and connected with the wheel brake cylinders, and the other of said bores being of relatively large diameter, said small bore having a port for supplying the operating liquid to the same, located in the wall of the cylinder in front of the small piston when in its inactive position, a pressure reservoir having a connection communicating with the said port, with means connected with the larger bore for maintaining liquid under pressure in communcation with the port, and a by-pass beyond the point of connection of the said pressure reservoir for returning liquid to the large bore to maintain the same completely full.

10. In a hydraulic brake apparatus, the combination of a master cylinder having two bores with pistons working in said bores in unison with each other, one of said bores being of relatively small diameter and connected with the wheel brake cylinders, and the other of said bores being of relatively large diameter, said small bore having a port communicating with the large bore for supplying the operating liquid to the small bore, located in the wall of the cylinder in front of the small piston when in its inactive position, the said pistons operating in their forward movement in applying the brakes, to develop a movement of liquid from the large bore toward the said port and small bore, means associated with the port for checking back flow of liquid passing from the large bore, and automatic means for replenishing the large bore with liquid to maintain the same completely full.

11. In a hydraulic brake apparatus for automobiles, the combination of a master-cylinder having two bores arranged in tandem, with tandem pistons working in said bores in unison with each other, one of said bores being of relatively small diameter and connected with the wheel brake cylinders, and the other bore being of relatively large diameter, said cylinder having a port connecting said bores, means for supplying liquid under pressure to the small bore, a connection for supplying liquid to the large bore and including a check valve operating to close when the pistons move forwardly in applying the brakes so that the said pistons co-operate to develop a flow of liquid from the large bore through the port to the small bore.

12. In a hydraulic brake apparatus for automobiles, the combination of a master cylinder having a bore with a piston and a chamber back of the piston, said cylinder having a port leading into the same at a point forward of the piston when the piston is in its inactive position and leading around to the chamber back of the piston, and means for maintaining and developing pressure in the liquid in the said chamber at the back of the piston when the piston is moved forwardly to apply the brakes and thereby prevent loss of liquid through the port from the forward end of the cylinder.

13. In a hydraulic brake apparatus for automobiles, the combination of a master cylinder having a movable piston therein for developing pressure within the cylinder, a connection from the master cylinder to the cylinders of the wheel brakes, said master cylinder having a forward chamber for the said piston, and a rear chamber back of the piston collecting any liquid leaking into the same past the piston, a pressure reservoir for the liquid for supplying liquid under pressure to the cylinder in front of the piston, said pressure reservoir having an auxiliary reservoir with a relief outlet into the same and a connection from the auxiliary reservoir for returning liquid that passes the relief outlet, to the rear chamber of the cylinder, and a connection from the rear chamber to the pressure reservoir.

14. In a hydraulic brake apparatus for automobiles, the combination of a master-cylinder having a movable piston therein for developing pressure within the cylinder, a connection from the master cylinder to the cylinders of the wheel brakes, said master cylinder having a rear chamber back of the piston, a pressure reservoir for the liquid for supplying liquid under pressure to the chamber in front of the piston, an auxiliary reservoir with a relief outlet into the same from the pressure reservoir, and a connection from the auxiliary reservoir for returning liquid that passes the relief-outlet, to the rear chamber of the cylinder, said cylinder having a port connecting the rear chamber of the cylinder with the front chamber with a check valve preventing the flow of liquid from the front end of the cylinder into the rear chamber.

15. In a hydraulic brake apparatus for automobiles, the combination of a master cylinder having a chamber with a movable piston therein for developing pressure in the said chamber in front of the piston, a connection from the master cylinder to the cylinders of the wheel brakes, said cylinder having a port leading into the chamber in front of the piston when in its inactive position, means for supplying the operating liquid under pressure to the said chamber through said port, and means for developing an abnormally high pressure in the liquid in said port when the piston commences its forward movement when the brakes are being applied, to prevent loss of liquid through said port from the said chamber.

16. In a hydraulic brake apparatus for automobiles, the combination of a master cylinder having a forward chamber with a movable piston therein for developing pressure in the forward chamber in front of the piston, said cylinder having a rear chamber of larger diameter than the forward chamber back of the piston with a port connecting the two chambers, means for supplying the operating liquid under pressure to the said forward chamber through said port and including a pressure reservoir with a relief outlet, a return connection beyond the relief outlet for leading liquid back into the rear chamber, with a check-valve, a second piston located back of the rear chamber and connected with the first piston, said second piston operating when the pistons are moved forwardly to apply the brakes to develop pressure in the rear chamber, operating to close the check valve in the return connection and force liquid from the rear chamber through the port and thereby prevent outward flow from the forward chamber through said port.

17. In a hydraulic brake apparatus for automobiles, the combination of a master cylinder having two bores of different diameters, a piston corresponding to each bore and movable therein, means for supplying operating liquid to the said bores, the piston in the smaller bore being mounted so that the liquid pressure developed in the large bore is imparted to it and operates to advance it in its own bore, a connection from the larger bore to the brake cylinders of the rear wheels and a connection from the smaller bore to the brake cylinders of the forward wheels.

18. In a hydraulic brake apparatus for automobiles, the combination of a master cylinder having two bores arranged in tandem, one of said bores being of relatively small diameter and the other bore of relatively large diameter, a piston movable in the large bore and having means for operating the same by a pedal to apply the brakes, means for supplying the operating liquid to each bore in front of its piston, the relatively small piston being exposed to the liquid pressure developed in the large bore so that the pressure in the large bore operates to advance the smaller piston in the braking movement, a connection from the large bore to the rear brake cylinders and a connection from the smaller bore to the forward brake cylinders.

19. In a hydraulic brake-apparatus, the combination of a cylinder with a bore corresponding to the front wheels and having a piston and a connection from the bore to the front wheel brake cylinders, a second bore corresponding to the rear wheels with its piston and a connection from it to the rear wheel brake cylinders, means for connecting the last named piston with the brake pedal to enable pressure in the last named bore to be developed to apply the rear brakes, the first named piston being mounted so that it is exposed to the liquid pressure developed in the second named bore so as to be advanced thereby and develop pressure for braking the forward wheels, and a slip connection between the two pistons enabling the piston that operates the brakes of the rear wheels to positively advance the other piston in case there is no pressure developed in the bore corresponding to the rear wheels.

20. In a hydraulic brake apparatus for automobiles, the combination of a master cylinder having two bores of different diameters, a piston corresponding to each bore and movable therein, means for supplying operating liquid to the said bores, the piston in the smaller bore being capable of limited relative movement with respect to the piston in the larger bore, and mounted so that the liquid pressure developed in the larger bore is imparted to it and exerts pressure on its rear face to advance it in its own bore, a connection from the larger bore to the brake cylinders of the rear wheels, and a connection from the smaller bore to the brake cylinders of the forward wheels.

21. A hydraulic brake apparatus as claimed in claim 20, in which the bores are of different diameters arranged in tandem to each other and having a connection between the same with a lost motion device whereby the pressure developed in the rear bore is imparted to the rear face of the plunger of smaller diameter.

22. In a fluid-actuated brake apparatus for an automobile having fluid-actuated brake cylinders at the wheels, the combination of cylinder means having two bores, pistons mounted in said bores, means for imparting movement from one piston to the other, means connecting one of said bores with the wheel brake cylinders to apply the brakes, and a by-pass port connecting the same bore at a point in advance of its piston, with the forward end of the other bore, and operating to prevent loss of volume of liquid in front of the advancing piston that applies the brakes.

23. In a fluid-actuated brake apparatus for automobiles having brake-cylinders at the wheels, the combination of a master cylinder having a forward bore and a rear bore, a plunger having a piston corresponding to each of said bores, said cylinder having a by-pass port passing out through its wall in advance of the forward piston and leading into the rear bore ahead of the rear piston, means for supplying operating liquid to the said bores, and a connection from the forward bore leading to the wheel brake cylinders, said rear piston operating to prevent efflux through the by-pass from the forward cylinder as the forward piston advances.

24. In a hydraulic brake apparatus for automobiles, the combination of a master cylinder having a bore with a piston and a chamber back of the piston, said cylinder having a port leading into the same at a point forward of the piston when the piston is in its inactive position and leading around to the chamber back of the piston, said cylinder having an outlet leading to the brakes at the wheels, and means for maintaining pressure in the liquid in the said chamber at the back of the piston when the piston is moved forwardly to apply the brakes and thereby prevent loss of liquid through the port from the forward end of the cylinder.

25. In a fluid-actuated brake apparatus for an automobile having fluid-actuated brake cylinders at the wheels, the combination of cylinder means having two bores, pistons mounted in the said bores, means for imparting movement from one piston to the other, means connecting one of said bores with the wheel brake cylinders to apply the brakes, said cylinders having a by-pass port connecting the last named bore at a point in advance of its piston, with the forward end of the other bore, and a reservoir for supplying the operating fluid to the cylinder means with a relief valve operating to maintain pressure of the fluid in the cylinder means at the commencement of the forward stroke and operating to prevent loss of volume of liquid in front of the advancing piston that applies the brakes, as it advances and passes the by-pass port.

26. In a hydraulic brake apparatus for automobiles, having hydraulic brake cylinders at the wheels, the combination of a master cylinder having a bore with a piston, and a chamber back of the piston independent of the brake cylinders at the wheels, said cylinder having a by-pass port leading into the same at a point forward of the piston when the piston is in its inactive position and leading around to the chamber back of the piston, and means for preventing escape of liquid through the by-pass port into the rear chamber from the forward part of the cylinder when the piston advances.

Signed at Los Angeles, California, this 29 day of July, 1927.

EUGENE G. CARROLL.